US009992331B2

(12) United States Patent
Chatterjee

(10) Patent No.: US 9,992,331 B2
(45) Date of Patent: Jun. 5, 2018

(54) CONTINUOUS CALL RECORDING

(71) Applicant: Manish Chatterjee, Calcutta (IN)

(72) Inventor: Manish Chatterjee, Calcutta (IN)

(73) Assignee: Avaya Inc., Santa Clara, CA (US)

( * ) Notice: Subject to any disclaimer, the term of this patent is extended or adjusted under 35 U.S.C. 154(b) by 97 days.

(21) Appl. No.: 14/834,602

(22) Filed: Aug. 25, 2015

(65) Prior Publication Data

US 2017/0064075 A1    Mar. 2, 2017

(51) Int. Cl.
| | |
|---|---|
| *H04L 12/16* | (2006.01) |
| *H04M 3/42* | (2006.01) |
| *H04M 3/22* | (2006.01) |
| *H04L 29/06* | (2006.01) |
| *H04M 3/12* | (2006.01) |

(52) U.S. Cl.
CPC .... *H04M 3/42221* (2013.01); *H04L 65/1006* (2013.01); *H04L 65/1046* (2013.01); *H04L 65/1069* (2013.01); *H04L 65/1083* (2013.01); *H04L 65/1096* (2013.01); *H04M 3/12* (2013.01); *H04M 3/2254* (2013.01)

(58) Field of Classification Search
CPC ................................................ H04M 3/42221
USPC ........................................................ 370/216
See application file for complete search history.

(56) References Cited

U.S. PATENT DOCUMENTS

| | | | |
|---|---|---|---|
| 2006/0147013 A1* | 7/2006 | Baumeister | H04M 3/4931 379/210.01 |
| 2011/0087705 A1* | 4/2011 | Swink | H04L 51/32 707/800 |
| 2012/0084492 A1* | 4/2012 | Stenfort | G06F 3/0605 711/103 |
| 2016/0018999 A1* | 1/2016 | Stenfort | G06F 3/0607 711/154 |

OTHER PUBLICATIONS

Rehor et al., "Use Cases and Requirements for SIP-Based Media Recording (SIPREC)," RFC 6341, Internet Engineering Task Force (IETF), Aug. 2011, 16 pages.

* cited by examiner

*Primary Examiner* — Shripal Khajuria
(74) *Attorney, Agent, or Firm* — Sheridan Ross P.C.

(57) ABSTRACT

In order to allow for redundant call recording, a first message is received by a first media recorder indicating that a second media recorder is recording a media stream of a communication session between a plurality of communication devices. The first message includes a unique identifier for the communication session between the plurality of communication devices. A determination is made that the second media recorder is unable to continue to record the media stream. In response to determining that the second media recorder is unable to record the media stream, the first media recorder sends a second message, to a Session Border Controller (SBC), that includes the unique identifier for the communication session between the plurality of communication devices. The SBC streams the media stream to the first media recorder. The first media recorder receives the media stream and records the media stream.

20 Claims, 3 Drawing Sheets

CONTINUOUS CALL RECORDING

TECHNICAL FIELD

The systems and methods disclosed herein relate to call recording and in particular to redundant call recording.

BACKGROUND

When a call is recorded in a Session Initiation Protocol (SIP) environment, the call recording process is typically based on the Internet Engineering Task Force (ITEF) RFC 6341 "Use Cases and Requirements for SIP-Based Media Recording (SIPREC)", the entire contents of which are hereby incorporated herein by reference. Continuous recording of a call works well as long as the media recorder is reachable and is in proper working order. However, if the media recorder is unreachable or is not working properly, the ITEF RFC 6341 standard does not describe how to redundantly manage a call recording.

SUMMARY

Systems and methods are provided to solve these and other problems and disadvantages of the prior art. In order to allow for redundant call recording, a first message is received by a first media recorder indicating that a second media recorder is recording a media stream of a communication session between a plurality of communication devices. The first message includes a unique identifier for the communication session between the plurality of communication devices. A determination is made that the second media recorder is unable to continue recording the media stream. For example, the second media recorder may send a HTTP/REST out of band message that the second media recorder is out of disk space. In response to determining that the second media recorder is unable to record the media stream, the first media recorder sends a second message to a Session Border Controller (SBC) (or similar network edge device) that includes the unique identifier for the communication session between the plurality of communication devices. In response, the SBC streams the media stream to the first media recorder. The first media recorder receives the media stream and records the media stream.

In an embodiment, a first message is received by a first media recorder indicating that a second media recorder is recording a media stream of a communication session between a plurality of communication devices. The first message includes a dialog identifier for a communication session between the second media recorder and a Session Border Controller (SBC). The communication session between the second media recorder and the SBC is for recording the media stream. A determination is made that the second media recorder is unable to continue recording the media stream. In response to determining that the second media recorder is unable to continue recording the media stream, the first media recorder sends a second message to the SBC that includes the dialog identifier for the communication session between the second media recorder and the SBC. In response, the SBC streams the media stream to the first media recorder. The first media recorder receives and records the media stream.

DETAILED DESCRIPTION

Figure 1:
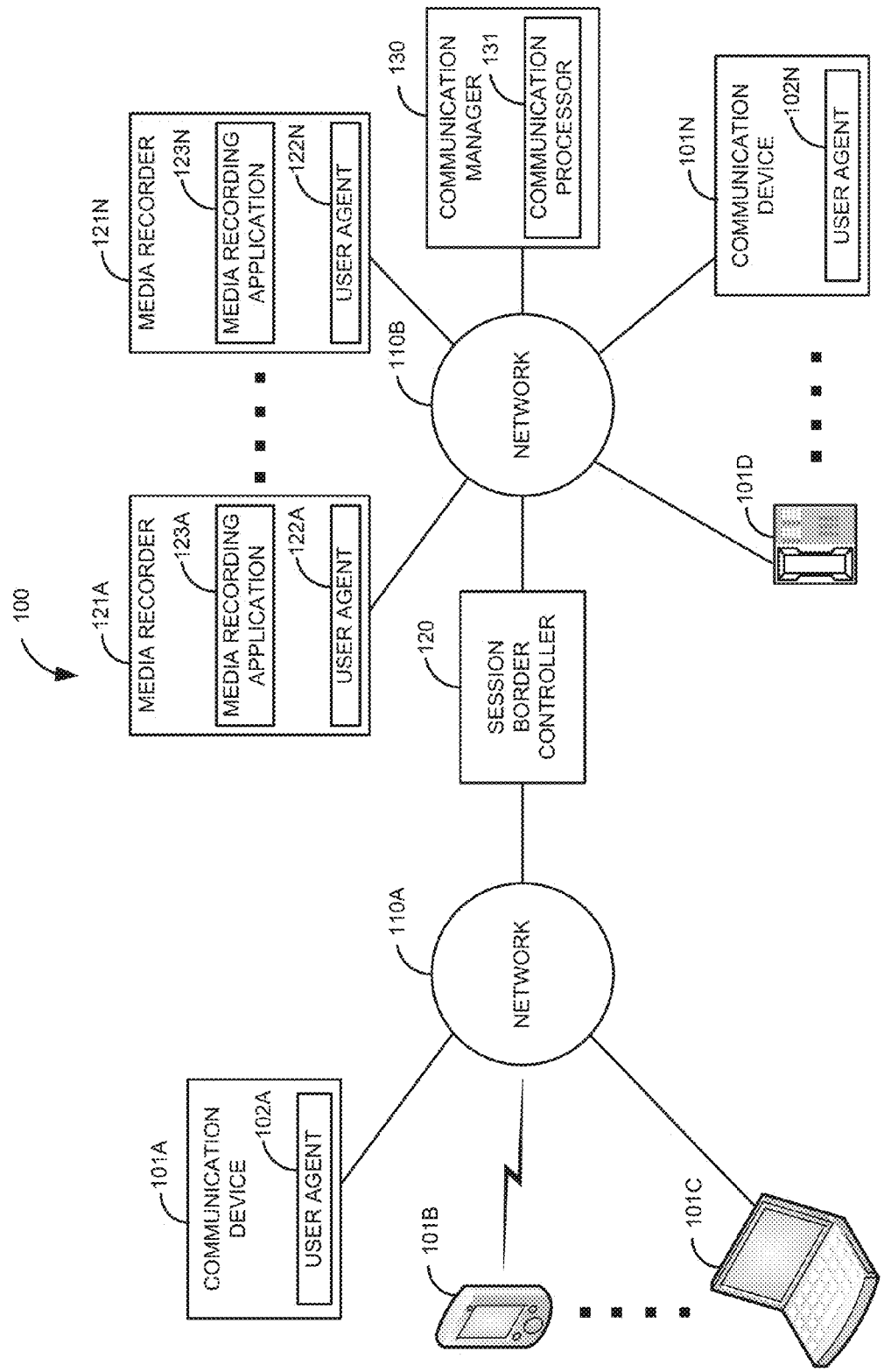
FIG. 1 is a block diagram of a first illustrative system for recording a media stream.

FIG. 1 is a block diagram of a first illustrative system 100 for recording a media stream. The first illustrative system 100 comprises communication devices 101A-101N, networks 110A-110B, a Session Border Controller (SBC) 120, media recorders 121A-121N, and a communication manager 130.

The communication devices 101A-101N can be or may include any hardware device that can communicate on the communication networks 110A-110B, such as a Personal Computer (PC), a telephone, a video system, a cellular telephone, a Personal Digital Assistant (PDA), a tablet device, a notebook device, a smart phone, a contact center agent terminal, a media server, and/or the like. As shown in FIG. 1, any number of communication devices 101A-101N may be connected to the communication networks 110A-110N.

The communication device 101A further comprises a User Agent (UA) 102A. Likewise, the communication 101N further comprises a user agent 102N. The user agents 102A/102N can be or may include any hardware/software that can handle SIP messages for the communication device 101A. Although the communication devices 101B-101D are not shown comprising a user agent 102, each of the communication devices 101B-101N can also include a respective user agent 102B-102D. In some embodiments, the user agent 102 may process messages for other types of communication sessions, such as video protocols, H.323, Web Real-Time Communication (WebRTC) protocol, (HTTP)/REpresentational State Transfer (REST) protocol, and/or the like.

The communication networks 110A-110B can be or may include any collection of electronic communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The communication networks 110A-110B can use a variety of protocols, such as Ethernet, Internet Protocol (IP), Transmission Communication Protocol (TCP), User Datagram Protocol (UDP), Session Initiation Protocol (SIP), Session Description Protocol (SDP), Integrated Services Digital Network (ISDN), Real-Time Protocol (RTP), and/or the like. Thus, the communication networks 110A-110B are electronic communication networks configured to carry messages via packets and/or circuit switched communications. In a one embodiment, the communication network 110A is a public network, such as the Internet and the communication network 110B is a private network, such as a corporate or enterprise network.

The SBC 120 can be or may include any hardware in combination with software that can provide security services for the communication network 110B, such as a firewall, a gateway, a Network Address Translator (NAT), protocol converter, and/or any other type of network edge device or collection of devices. The SBC 120 has the ability to fork any number media streams for recording to the media recorders 121A-121N.

The media recorders 121A-121N can be any electronic device that can record a media stream. The media recorders 121A-121N can record a digital media stream and/or an analog media stream. The media recorders 121A-121N can record a video media stream, an audio media stream, a text media stream (e.g., an Instant Messaging media stream), and/or the like. The media recorders 121A-121N may record a portion of a media stream. The media recorders 121A-121N may record any number of media streams. The media recorders 121A-121N may reside on a media recording server. The media recorders 121A-121N may be located at different locations on the network 110B or in a common media server. The media recorders 121A-121N may comprise any number of media recorders from two to N, where N is an integer. The media recorders 121A-121N may represent a pool of media recorders. The media recorders 121A-121N will typically have an active recorder and a standby recorder. For example the media recorder 121A may be an active recorder and the media recorder 121N may be a standby recorder.

The media recorders 121A-121N also includes a respective user agent 122A-122N. The user agents 122A-122N can be similar to the user agents 102A-102N. The user agents 122A-122N can process SIP messages, SDP messages, RTP messages, and/or the like for recording a media stream. In some embodiments, the user agent 122 may process messages for other types of communication sessions, such as video protocols, H.323, Web Real-Time Communication (WebRTC) protocol, (HTTP)/REpresentational State Transfer (REST) protocol, and/or the like.

The media recorders 121A-121N also includes a respective media recording application 123A-123N. The media recording applications 123A-123N can manage how and when media streams are recorded.

The communication manager 130 can be any hardware coupled with software that can manage communications, such as a Private Branch Exchange (PBX), a proxy server, a router, a call processor, a network switch, a central office switch, and/or the like. The communication manager 130 further comprises a communication processor 131.

The communication processor 131 can be any processor that can process communications, such as, a microprocessor, a Digital Signaling Processor (DSP), a microcontroller, and/or the like. The communication processor 131 is typically coupled with firmware and/or software to process communications.

Figure 2:
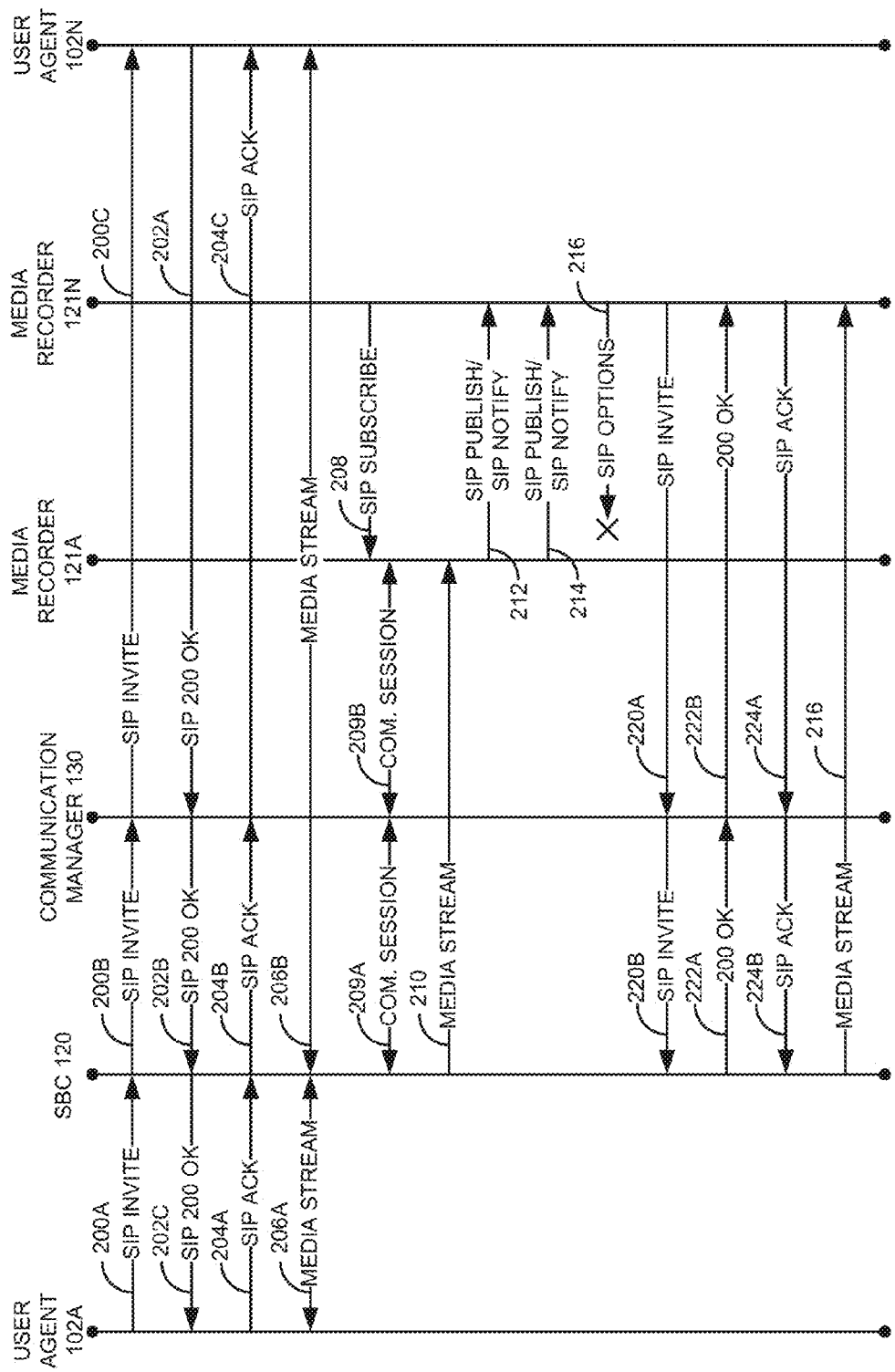
FIG. 2 is a flow diagram of a process for recording a media stream.
Figure 3:
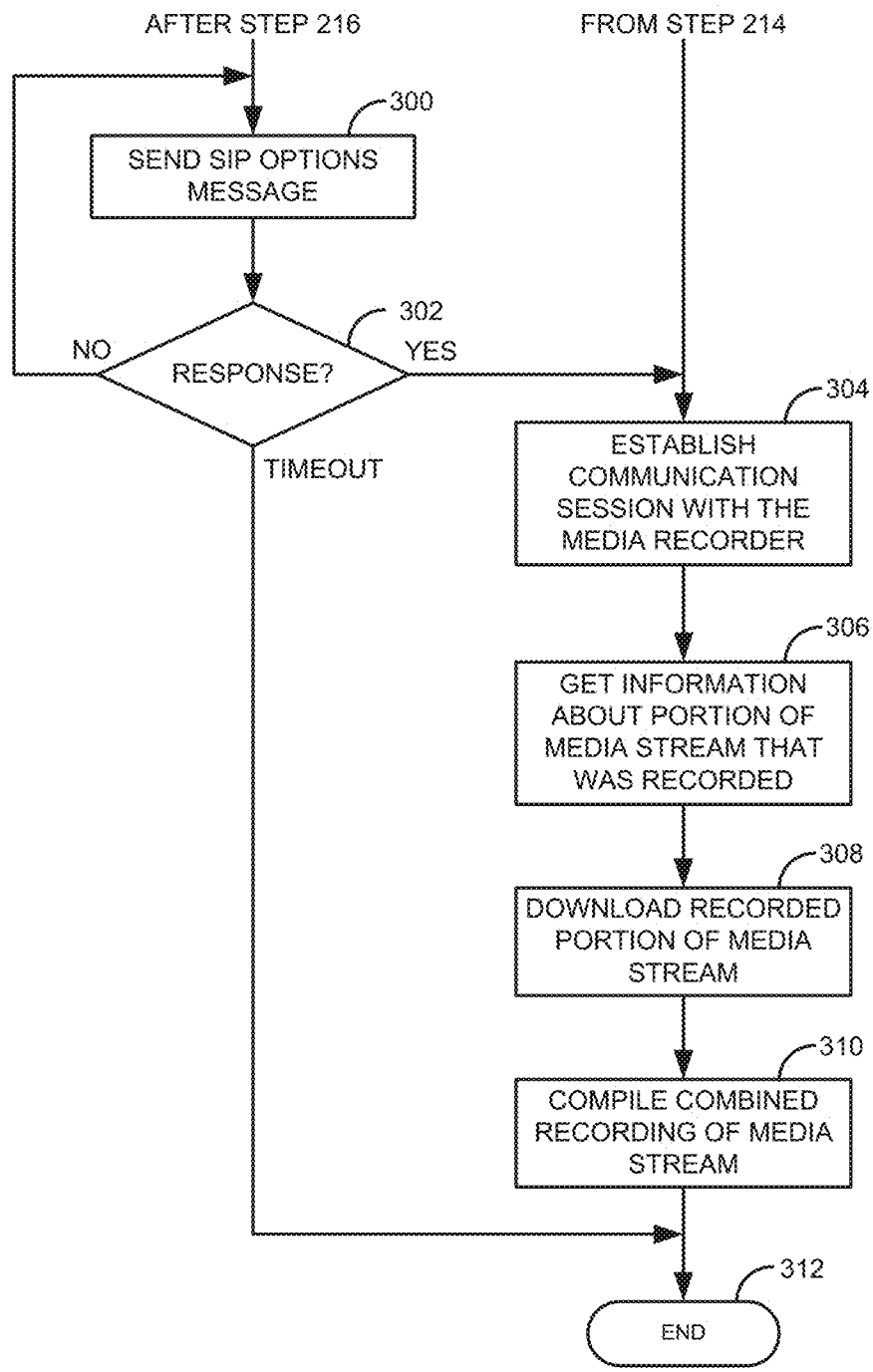
FIG. 3 is a flow diagram of a process for compiling a media stream.

FIG. 2 is a flow diagram of a first process for recording a media stream. Illustratively, the communication devices 101A-101N, the user agents 102A-102N, the SBC 120, the media recorders 121A-121N, the user agents 122A-122N, the media recording applications 123A-123N, the communication manager 130, and the communication processor 131 are stored-program-controlled entities, such as a computer or processor, which performs the method of FIGS. 2-3 and the processes described herein by executing program instructions stored in a non-transitory computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The processes of FIGS. 2-3 are described based on the establishment of a communication session between the communication devices 101A and 101N. However, the processes described in FIGS. 2-3 will work for communication sessions between any of the communication devices 101A-101C and the communication devices 101D-101N. The processes described in FIGS. 2-3 will work where there are more than two communication devices 101A-101N involved in the communication session. The processes described for FIGS. 2-3 will also work for voice, video, and text based communications (e.g., Instant Messaging (IM) communication sessions). For example, using the Message Session Relay Protocol (MSRP) described in Network Working Group RFC 4975, a separate media path for an IM session can be sent through the SBC 120 and recorded using the processes described in FIGS. 2-3. The processes described in FIGS. 2-3 are described using SIP, SDP, and RTP. However, the process described in FIGS. 2-3 can be implemented using various combinations of SIP, SDP, and RTP, video protocols, H.323, ISDN, WebRTC, REST, IP, TCP, UDP, and/or the like. For example, the processes of FIGS. 2-3 may be implemented using WebRTC and RTP.

The process starts in step 200A when the user agent 102A sends a SIP INVITE message to establish a communication session to the communication device 102N. For example, when a user of the communication device 101A makes a voice call to a 1-800 number of a contact center or where the user of the communication device 101A makes a call to a user in a corporate network (e.g., network 110B). The SIP INVITE message is received by the SBC 120 in step 200A. The SBC 120 sends the SIP INVITE message in step 200B to the communication manager 130. The communication manager 130 sends the SIP INVITE message to the user agent 102N in step 200C. For example, the SIP INVITE message of step 200C may be sent to the communication device 101N from a call center queue when a call center agent becomes available.

The user agent 102N responds to the SIP INVITE message of step 200C by sending a SIP 200 OK message to the communication manager 130 in step 202A. For example, the SIP 200 OK message is sent when the user of the communication device 101N answers the communication device 101A (e.g., the user's telephone). The SIP 200 OK message is sent by the communication manager 130 to the SBC 120 in step 202B. The SBC 120 sends the SIP 200 OK message to the user agent 102A in step 202C. The user agent 102A responds to the SIP 200 OK message of step 202C by sending a SIP ACK message in step 204A to the SBC 120. The SBC 120 sends the SIP ACK message to the communication manager 130 in step 204B. The communication manager 130 sends the SIP ACK message to the user agent 102N in step 204C. At this point, the media stream of steps 206A-206B can be setup (e.g., using Real-Time Protocol (RTP)/Session Description Protocol (SDP)) to stream media between the user agent 102A and the user agent 102N. For example, the media may be media for a video call between the communication device 101A and the communication device 101N.

In FIG. 2, the media recorder 121A is a primary media recorder (e.g., an active media recorder) and the media recorder 121N is a secondary media recorder (e.g., a standby media recorder). In some embodiments there may be more than two media recorders 121. For example, a pool of media recorders 121 may be used. The media recorder 121N is used to record the media stream if the media recorder 121A is unable to record the media stream. For example, the media recorder 121A may not be able to record the media stream because the media recorder 121A has failed (e.g., a hardware and/or software failure), the media recorder 121A does not have enough media space (e.g., enough disk space to continue recording the media session), the media recorder 121A is no longer receiving the media stream, the media recorder is being taken out of service for maintenance, the communication network 110A and/or 110B has some type of failure, and/or the like.

The user agent 122N may optionally send a SIP SUBSCRIBE message to the media recorder 121A in step 208. The SIP SUBSCRIBE message of step 208 may be optional if a SIP PUBLISH message is used instead of a SIP SUBSCRIBE/NOTIFY messages (described below). The SIP SUBSCRIBE message of step 208 is sent by the user agent 122N to subscribe to an event that indicates at least one of: 1) when the media recording application 123A receives the media stream, 2) when the media recording application 123A starts recording the media stream of step 206, 3) when the media recording application 123A receives an indication that the media stream will be sent, and/or the like. The SIP SUBSCRIBE message of step 208 is shown as being sent after the media stream of step 206 has started. However, the SIP SUBSCRIBE message of step 208 may be sent before any of the steps 200, 202, 204, or 206. In addition, the SIP SUBSCRIBE message of step 208 may be sent after step 210.

The SIP SUBSCRIBE message of step 208 may also include subscribing to an event of where the media recorder 121A is unable to record the media stream for one or more reasons, such as, the media recorder 121A has failed, the media recorder 121A does not have enough media space, the media recorder 121A is no longer receiving the media stream, there has been a network 110 failure, and/or the like. Alternatively, a separate SIP SUBSCRIBE message (not shown) may be sent to subscribe to the one or more events of where the media recorder 121A is unable to record the media stream.

The SBC 120 establishes a communication session with the media recorder 121A in steps 209A-209B. Although not fully shown for simplicity, the SBC 120 can establish the communication session with the media recorder 121A by sending a SIP INVITE to establish a communication session between the SBC 120 and the media recorder 121A (e.g., similar to steps 200, 202, and 204). The SBC 120 forks the media stream and sends the media steam to the media recorder 121A in step 210.

In response to receiving the media stream in step 210, recording the media stream, and/or the establishment of the communication session in step 209, the user agent 122A sends a SIP NOTIFY (if the SIP SUBSCRIBE message was sent in step 208) to the media recorder 121N in step 212. The SIP NOTIFY message of step 212 indicates that the media recording application 123A is recording (or is receiving the media stream) a media stream between the communication devices 101A and 101N. In addition, the SIP SUBSCRIBE message of step 212 includes a unique identifier for the communication session between the communication devices 101A-101N. The unique identifier can be any identifier that is unique, such as, a Global Session Identifier (GSID), a Universal Call Identifier (UCID), and/or the like.

The user agent 122N receives the SIP NOTIFY message with the unique identifier for the communication session between the communication devices 101A and 101N in step 212. The media recorder 121N stores the unique identifier.

In another embodiment, instead of using the SIP SUBSCRIBE/SIP NOTIFY messages of steps 208 and 212, a single SIP PUBLISH message can be sent in step 212 by the media recorder 121A. The SIP PUBLISH message in this embodiment of step 212 also includes the unique identifier.

Alternatively, instead of sending a SIP SUBSCRIBE/NOTIFY or SIP PUBLISH, the unique identifier may be sent using an out of bound mechanism, such as HTTP/REST. For example, instead sending the SIP messages of steps 212/214, an HTTP/REST message could be sent.

The media recording application 123A determines that the media recorder 121A is unable to continue recording the media stream in step 214. In response to the media recorder 121A being unable to continue recording the media stream, the user agent 122A sends a SIP NOTIFY message (in response to the SIP SUBSCRIBE message of step 208 or the separate SIP SUBSCRIBE message described above) to indicate that the media recording application 123A cannot record the media stream in step 214.

Alternatively, instead of using SIP SUBSCRIBE/SIP NOTIFY messages, the user agent 122A can just send a SIP PUBLISH message in step 214. The SIP PUBLISH message of step 214 also indicates that the media recording application 123A is unable to continue to record the media stream.

Instead of using the SIP SUBSCRIBE/NOTIFY message of step 214, the user agent 122N can periodically send a SIP OPTIONS message(s) to the media recorder 121A and look for the media recorder 121A to respond in step 216. If the media recorder 121A does not respond, the media recording application 123N knows that the media recorder 121A has likely failed and cannot respond. For example, if the media recorder 121A fails to respond to 3 consecutive SIP OPTIONS message, the media recorder 121N will know that the media recorder has likely filed or cannot respond.

The messages of steps 208, 212, 214, and 216 are shown as being directly sent between the media recorder 121A and the media recorder 121N. However, in some embodiments, the messages of steps 208, 212, 214, and 216 may be sent via the communication manager 130.

The processes of determining that the media recorder 121A is unable to continue recording the media stream in steps 208, 212, 214, and 216 are described using SIP messages. However, the messages of steps 208, 212, 214, and 216 may be implemented using any protocol, such as Hyper Text Transport Protocol (HTTP)/REpresentational State Transfer (REST) protocol, proprietary protocols, UDP/IP, TCP/IP, and/or the like.

Based on either of the steps 214 or 216, the media recording application 123N determines that the media recorder cannot continue to record the media stream. In response to either of the steps 214 and/or 216, the user agent 122N sends a SIP INVITE message, in steps 220A-220B to the SBC 120 via the communication manager 130 that includes the unique identifier to identify the media stream of the communication session between the communication devices 101A-101N. The SIP INVITE message of steps 220A-220B may be a regular SIP INVITE message if the user agent 122N is not state aware or a SIP INVITE with replaces header if the user agent 122N is state aware. The SBC 120 receives the SIP INVITE message of step 220B. The SIP INVITE message of step 220 includes the unique identifier received in step 212. The SBC 120 responds by sending a 200 OK, in steps 222A-222B to the media recorder 121N via the communication manager 130. The user agent 122N responds, in steps 224A-224B by sending a SIP ACK message to the SBC 120 via the communication manager 130.

The SBC 120 uses the unique identifier (received in the SIP INVITE message of step 220) to identify the media stream of the communication session between the communication devices 101A and 101N. For example, if the media recorder 121A is recording two media streams (e.g., between the communication devices 101A and 101N and between the communication devices 101B and 101D) the SBC 120 can identify the communication session between the communication devices 101A and 101N based on the unique identifier. The SBC 120 sends the media stream to the media recorder 121N based on the identified media stream in step 226.

In another embodiment, instead of sending the unique identifier for the communication session between the communication device 101A and 101N in step 212, the SIP PUBLISH/SIP NOTIFY message of step 212 includes a dialog identifier for the communication session that was established between the SBC 120 and the media recorder 121A in step 209. The dialog identifier can be any identifier that can uniquely identify the communication session between the SBC 120 and the media recorder 121A. The media recording application 123N uses the dialog identifier by sending the dialog identifier in the SIP INVITE (or INVITE with replaces header) in step 220.

Alternatively, instead of the user agent 122N sending the SIP INVITE message in step 220, the media recording application 123N could send a SIP PUBLISH/SIP NOTIFY message to the SBC 120 that includes the dialog identifier or the unique identifier. In this case, the SBC 120 would initiate the communication session by sending a SIP INVITE.

FIG. 3 is a flow diagram of a process for compiling a media stream. The process of FIG. 3 occurs (depending on implementation) after steps 216 or 214 of FIG. 2.

After step 216 where there is no response received to the SIP OPTIONS message, the media recorder 121N sends a second SIP OPTIONS message to the media recorder 121A in step 300. If the media recorder 121A does not respond by sending a 200 OK message within a defined time period in step 302, the process goes back to step 300. This process of sending SIP OPTIONS messages of steps 300 and 302 may continue for a designated number of times. If a response based on a designated number of SIP OPTIONS message (a timeout) is not received, the process goes to step 312 and ends. If a response to a SIP OPTIONS message is received in step 302, the process goes to step 304.

If the SIP PUBLISH/SIP NOTIFY message of step 214 is received, the SIP PUBLISH/NOTIFY message of step 214 may include additional information. For example, the SIP PUBLISH/NOTIFY message of step 214 may indicate a specific reason why the media recorder 121A is unable to record the media session. For example, the SIP PUBLISH/ NOTIFY message of steps 214 may indicate that the media recorder 121A is unable to record the media stream because the media recorder 121A has ran out of media space.

In one embodiment, the SIP PUBLISH/NOTIFY message of steps 214 may also include one or more pointers, links, and/or identifiers (e.g., a GSID or a UCID) that point to the beginning, end and/or identify the media stream that has been recorded by the media recorder 121A (before the condition of being unable to continue recording the media stream). This information can be used by the media recording application 123N to compile a complete recording of the media stream.

The user agent 122N establishes a communication session with the media recorder 121A in step 304. For example, by establishing a SIP communication session using a SIP INVITE/SIP 200 OK/SIP ACK as described previously in FIG. 2. The SIP INVITE includes the unique identifier or the dialog identifier. The media recording application 123N, in step 306, can optionally get information about the media stream that was recorded by the media recorder 121A before the media recorder 121A could no longer continue recording the media stream. For example, the media recording application 123N may get meta-data associated with the media session, such as, user data, associated documents, and/or the like.

The media recording application 123N downloads the recorded portion of the media stream from the media recording application 123A in step 308. The media recording application 123N compiles a combined recording of the media stream using the downloaded recorded portion of the media stream recorded by the media recorder 121A and the portion of the media stream that was recorded by the media recorder 121N in step 310. The compiled portion of the media stream may include merging the meta-data from the two recordings. For example, if an additional user conferenced when the media recorder 121N recorded the communication session, the meta-data is merged to show the additional user being conferenced. Likewise, any associated documents that were attached are compiled to create the combined media stream. The process ends in step 312. The process of FIG. 3 will work for either of the processes described in FIG. 2.

For example, if the media recorder 121A only recorded the first half of the media steam and the media recorder 121N recorded the second half of the media stream, the media recording application 123N will compile a combined recording of the media stream using the downloaded half of the media stream recorded by the media recorder 121A and the half of the media stream recorded by the media recorder 121N. The compiled combined recording of the media stream is then stored by the media recording application 123A. A user can then retrieve the combined media stream.

The combined recording of the media stream may or may not be a complete recording. For example, if the media recorder 121A has a software failure and reboots (the process of steps 300 and 302), the recorded portion of the media stream recorded by the media recorder 121A may have a gap between the recorded portion of the media stream recorded by the media recorder 121N.

In one embodiment, the portion recorded by the media recorder 121A and the portion recorded by the media recorder 121N may overlap. In this embodiment, the media recording application 123N may remove one of the overlapping portions when compiling the combined media stream. This can be accomplished by word detection, time stamps, and/or the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:
1. A method comprising:
receiving a first message regarding processing by a second media recorder of a media stream of a communication session between a plurality of communication devices;
determining that the second media recorder is unable to continue processing the media stream of the communication session between the plurality of communication devices;

in response to determining that the second media recorder is unable to continue processing the media stream of the communication session between the plurality of communication devices, sending a second message, to a Session Border Controller (SBC), that includes a unique identifier for the communication session between the plurality of communication devices; and receiving, at a first media recorder, the media stream of the communication session between the plurality of communication devices via the SBC.

2. The method of claim 1, wherein the first message indicates that the second media recorder is: recording a media stream of the communication session between the plurality of communication devices, receiving the media stream of the communication session between the plurality of communication devices, or going to start receiving the media stream of the communication session between the plurality of communication devices, wherein the first message includes a unique identifier for the communication session between the plurality of communication devices, and wherein the unique identifier is at least one of a Global Session Identifier (GSID) or a Universal Call Identifier (UCID).

3. The method of claim 1, wherein the second message is a one of a Session Initiation Protocol (SIP) INVITE message, a SIP INVITE with replaces header message, a SIP PUBLISH message, or a SIP NOTIFY message, and further comprising:

receiving, at the SBC, the second message;
retrieving the unique identifier for the communication session between the plurality of communication devices from the second message;
identifying the media stream of the communication session between the plurality of communication devices based on the unique identifier; and
in response to identifying the media stream of the communication session between the plurality of communication devices based on the unique identifier, sending the media stream of the communication session between the plurality of communication devices to the first media recorder.

4. The method of claim 1, further comprising: recording the media stream of the communication session between the plurality of communication devices received at the first media recorder.

5. The method of claim 1, wherein determining that the second media recorder is unable to process the media stream of the communication session between the plurality of communication devices comprises at least one of:

receiving a third message from the second media recorder that the second media recorder is unable to process the media stream of the communication session between the plurality of communication devices; or
not receiving a response from the second media recorder.

6. The method of claim 5, wherein the third message is at least one of a SIP NOTIFY message or a SIP PUBLISH message.

7. The method of claim 1, wherein determining that the second media recorder is unable to process the media stream of the communication session between the plurality of communication devices is based on at least one of: the second media recorder failing, the second media recorder not having enough media space, the second recorder no longer receiving the media stream of the communication session between the plurality of communication devices, or a network failure.

8. The method of claim 1, wherein the first message indicates that the second media recorder is: recording a media stream of the communication session between the plurality of communication devices; receiving the media stream of the communication session between the plurality of communication devices; or going to start receiving the media steam of the communication session between the plurality of communication devices, wherein the first message includes a unique identifier for the communication session between the plurality of communication devices, and wherein the first message is at least one of a SIP NOTIFY message or a SIP PUBLISH message.

9. The method of claim 1, further comprising:
establishing, by the first media recorder, a communication session with the second media recorder;
downloading, by the first media recorder, a portion of the media stream of the communication session between the plurality of communication devices that was recorded by the second media recorder; and
compiling a recording of the media stream of the communication session between the plurality of communication devices using the portion of the media stream of the communication session between the plurality of communication devices that was recorded by the second media recorder and a portion of the media stream of the communication session between the plurality of communication devices recorded by the first media recorder.

10. A first media recorder comprising:
a microprocessor; and
a computer readable medium, coupled with the microprocessor and comprising microprocessor readable and executable instructions that cause the microprocessor to execute:
a user agent that receives a first message regarding processing by a second media recorder of a media stream of a communication session between a plurality of communication devices, wherein the user agent sends a second message, to a Session Border Controller (SBC), that includes a unique identifier for the communication session between the plurality of communication devices in response to determining that the second media recorder is unable to continue processing the media stream of the communication session between the plurality of communication devices; and
a media recording application that determines that the second media recorder is unable to continue processing the media stream of the communication session between the plurality of communication devices and receives the media stream of the communication session between the plurality of communication devices.

11. The first media recorder of claim 10, wherein the first message indicates that the second media recorder is: recording a media stream of the communication session between the plurality of communication devices, receiving the media stream of the communication session between the plurality of communication devices, or going to start receiving the media steam of the communication session between the plurality of communication devices, wherein the first message includes a unique identifier for the communication session between the plurality of communication devices, and wherein the unique identifier is at least one of a Global Session Identifier (GSID) or a Universal Call Identifier (UCID).

12. The first media recorder of claim 10, wherein the second message is a one of a Session Initiation Protocol (SIP) INVITE message, a SIP INVITE with replaces header message, a SIP PUBLISH message, or a SIP NOTIFY message, and further comprising:

the SBC that receives the second message, retrieves the unique identifier for the communication session between the plurality of communication devices from the second message, identifies the media stream of the communication session between the plurality of communication devices based on the unique identifier, and in response to identifying the media stream between the plurality of communication devices based on the unique identifier, sends the media stream of the communication session between the plurality of communication devices to the first media recorder.

13. The first media recorder of claim 10, wherein the first media recorder records the media stream of the communication session between the plurality of communication devices received at the first media recorder.

14. The first media recorder of claim 10, wherein the processing comprises recording of the media stream and wherein determining that the second media recorder is unable to record the media stream of the communication session between the plurality of communication devices comprises at least one of:

receiving a third message from the second media recorder that the second media recorder is unable to record the media stream of the communication session between the plurality of communication devices; or not receiving a response from the second media recorder.

15. The first media recorder of claim 14, wherein the third message is at least one of a SIP NOTIFY message or a SIP PUBLISH message.

16. The first media recorder of claim 10, wherein the processing comprises recording of the media stream and wherein determining that the second media recorder is unable to record the media stream of the communication session between the plurality of communication devices is based on at least one of: the second media recorder failing, the second media recorder not having enough media space, the second recorder no longer receiving the media stream, or a network failure.

17. The first media recorder of claim 10, wherein the first message indicates that the second media recorder is: recording a media stream of the communication session between the plurality of communication devices, receiving the media stream of the communication session between the plurality of communication devices, or going to start receiving the media steam of the communication session between the plurality of communication devices, wherein the first message includes a unique identifier for the communication session between the plurality of communication devices, and wherein the first message is at least one of a SIP NOTIFY message or a SIP PUBLISH message.

18. The first media recorder of claim 10, wherein the first media recorder establishes a communication session with the second media recorder, downloads a portion of the media stream of the communication session between the plurality of communication devices that was recorded by the second media recorder, and compiles a recording of the media stream of the communication session between the plurality of communication devices using the portion of the media stream of the communication session between the plurality of communication devices that was recorded by the second media recorder and a portion of the media stream of the communication session between the plurality of communication devices recorded by the first media recorder.

19. A method comprising:

receiving a first message indicating that a second media recorder is processing a media stream of a communication session between a plurality of communication devices;

determining that the second media recorder is unable to continue processing the media stream of the communication session between the plurality of communication devices;

in response to determining that the second media recorder is unable to continue processing the media stream of the communication session between the plurality of communication devices, sending a second message, to a Session Border Controller (SBC), that includes a dialog identifier for a communication session between the second media recorder and the SBC; and receiving, at a first media recorder, the media stream of the communication session between the plurality of communication devices.

20. The method of claim 19, wherein the first message indicates that the second media recorder is: recording a media stream of the communication session between the plurality of communication devices, receiving the media stream of the communication session between the plurality of communication devices, or going to start receiving the media steam of the communication session between the plurality of communication devices, wherein the first message includes the dialog identifier for a communication session between the second media recorder and the SBC, and wherein the second message is one of a Session Initiation Protocol (SIP) INVITE message, a SIP INVITE with replaces header message, a SIP PUBLISH message, or a SIP NOTIFY message.

* * * * *